United States Patent
Galbreath et al.

(10) Patent No.: US 9,990,430 B2
(45) Date of Patent: *Jun. 5, 2018

(54) GRAPH SERVER QUERYING FOR MANAGING SOCIAL NETWORK INFORMATION FLOW

(75) Inventors: Nicholas Galbreath, San Francisco, CA (US); Mirko Predosin, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 682 days.

This patent is subject to a terminal disclaimer.

(21) Appl. No.: 12/981,311

(22) Filed: Dec. 29, 2010

(65) Prior Publication Data

US 2011/0099167 A1    Apr. 28, 2011

Related U.S. Application Data

(63) Continuation of application No. 10/854,054, filed on May 26, 2004, now Pat. No. 8,572,221.

(51) Int. Cl.
| | | |
|---|---|---|
| *G06F 7/00* | (2006.01) | |
| *G06F 17/30* | (2006.01) | |
| *G06Q 30/02* | (2012.01) | |
| *H04L 29/08* | (2006.01) | |
| *H04L 29/06* | (2006.01) | |

(52) U.S. Cl.
CPC ....... *G06F 17/30867* (2013.01); *G06Q 30/02* (2013.01); *H04L 65/403* (2013.01); *H04L 67/10* (2013.01); *H04L 67/306* (2013.01)

(58) Field of Classification Search
CPC .......... G06F 17/30867; G06F 17/3089; G06F 17/30283; G06F 17/30766; G06F 17/30023

USPC ......................................... 707/732, 736, 798
See application file for complete search history.

(56) References Cited

U.S. PATENT DOCUMENTS

| | | |
|---|---|---|
| 4,987,554 A | 1/1991 | Kaufman |
| 4,989,141 A | 1/1991 | Lyons et al. |
| 5,101,475 A | 3/1992 | Kaufman et al. |
| 5,189,608 A | 2/1993 | Lyons et al. |
| 5,257,365 A | 10/1993 | Powers et al. |

(Continued)

FOREIGN PATENT DOCUMENTS

WO    WO 98/49636    11/1998

OTHER PUBLICATIONS

Li, C. et al., "A Data Model for Supporting On-Line Analytical Processing," Presented at the International Conference on Information and Knowledge Management, 1996, pp. 81-88.

(Continued)

*Primary Examiner* — Daniel Kuddus
(74) *Attorney, Agent, or Firm* — Baker Botts L.L.P.

(57) ABSTRACT

An online social network is managed using one server for database management tasks and another server, preferably in a distributed configuration, for CPU-intensive computational tasks, such as finding a shortest path between two members or a degree of separation between two members. The additional server has a memory device containing relationship information between members of the online social network and carries out the CPU-intensive computational tasks using this memory device. With this configuration, the number of database lookups is decreased and processing speed is thereby increased.

24 Claims, 6 Drawing Sheets

(56) References Cited

U.S. PATENT DOCUMENTS

| | | |
|---|---|---|
| 5,278,966 A | 1/1994 | Parks et al. |
| 5,359,724 A | 1/1994 | Earle |
| 5,361,385 A | 11/1994 | Bakalash |
| 5,379,419 A | 1/1995 | Heffernan et al. |
| 5,706,495 A | 1/1998 | Chadha et al. |
| 5,745,764 A | 4/1998 | Leach et al. |
| 5,765,028 A | 6/1998 | Gladden |
| 5,781,896 A | 7/1998 | Dalal |
| 5,794,228 A | 8/1998 | French et al. |
| 5,794,229 A | 8/1998 | French et al. |
| 5,794,246 A | 8/1998 | Sankaran et al. |
| 5,799,300 A | 8/1998 | Ragrawal et al. |
| 5,805,885 A | 9/1998 | Leach et al. |
| 5,822,751 A | 10/1998 | Gray et al. |
| 5,832,475 A | 11/1998 | Agrawal et al. |
| 5,850,547 A | 12/1998 | Waddington et al. |
| 5,852,821 A | 12/1998 | Chen et al. |
| 5,864,184 A | 1/1999 | Lynch |
| 5,864,857 A | 1/1999 | Ohata et al. |
| 5,890,151 A | 3/1999 | Agrawal et al. |
| 5,901,287 A | 5/1999 | Bull |
| 5,905,985 A | 5/1999 | Malloy et al. |
| 5,915,257 A | 6/1999 | Gartung et al. |
| 5,918,225 A | 6/1999 | White et al. |
| 5,918,232 A | 6/1999 | Pouschine et al. |
| 5,926,818 A | 7/1999 | Malloy |
| 5,926,820 A | 7/1999 | Agrawal et al. |
| 5,940,822 A | 8/1999 | Haderie et al. |
| 5,963,936 A | 10/1999 | Cochrane et al. |
| 5,978,788 A | 11/1999 | Castelli et al. |
| 5,978,796 A | 11/1999 | Malloy et al. |
| 5,987,467 A | 11/1999 | Ross et al. |
| 5,991,754 A | 11/1999 | Raitto et al. |
| 5,999,192 A | 12/1999 | Selfridge et al. |
| 6,003,029 A | 12/1999 | Agrawal et al. |
| 6,006,216 A | 12/1999 | Griffin et al. |
| 6,023,695 A | 2/2000 | Osborn et al. |
| 6,034,697 A | 3/2000 | Becker |
| 6,064,499 A | 5/2000 | Dalal |
| 6,108,647 A | 8/2000 | Poosala et al. |
| 6,115,705 A | 9/2000 | Larson |
| 6,122,628 A | 9/2000 | Castelli et al. |
| 6,134,541 A | 10/2000 | Castelli et al. |
| 6,141,655 A | 10/2000 | Johnson et al. |
| 6,151,601 A | 11/2000 | Papierniak et al. |
| 6,161,103 A | 12/2000 | Rauer et al. |
| 6,163,774 A | 12/2000 | Lore et al. |
| 6,173,310 B1 | 1/2001 | Yost et al. |
| 6,182,060 B1 | 1/2001 | Hedgcock et al. |
| 6,182,061 B1 | 1/2001 | Matsuzawa et al. |
| 6,189,004 B1 | 2/2001 | Rassen et al. |
| 6,205,447 B1 | 3/2001 | Malloy |
| 6,208,975 B1 | 3/2001 | Bull et al. |
| 6,209,036 B1 | 3/2001 | Aldred et al. |
| 6,212,515 B1 | 4/2001 | Rogers |
| 6,212,524 B1 | 4/2001 | Weissman et al. |
| 6,212,617 B1 | 4/2001 | Hardwick |
| 6,249,791 B1 | 6/2001 | Osborn et al. |
| 6,269,369 B1 * | 7/2001 | Robertson .............. G06Q 10/02 |
| 6,269,393 B1 | 7/2001 | Yost et al. |
| 6,317,750 B1 | 11/2001 | Tortolani et al. |
| 6,321,241 B1 | 11/2001 | Gartung et al. |
| 6,324,533 B1 | 11/2001 | Agrawal et al. |
| 6,330,564 B1 | 12/2001 | Hellerstein et al. |
| 6,347,332 B1 * | 2/2002 | Malet ................ G06F 17/30867 707/E17.109 |
| 6,374,234 B1 | 4/2002 | Netz |
| 6,385,301 B1 | 5/2002 | Nolting et al. |
| 6,385,604 B1 | 5/2002 | Bakalash et al. |
| 6,397,195 B1 | 5/2002 | Pinard et al. |
| 6,405,208 B1 | 6/2002 | Raghavan et al. |
| 6,408,292 B1 | 6/2002 | Bakalash et al. |
| 6,434,544 B1 | 8/2002 | Bakalash et al. |
| 6,473,764 B1 | 10/2002 | Petculescu et al. |
| 6,477,536 B1 | 11/2002 | Pasumansky et al. |
| 6,484,179 B1 | 11/2002 | Roccaforte |
| 6,493,728 B1 | 12/2002 | Berger |
| 6,535,872 B1 | 3/2003 | Castelli et al. |
| 6,542,750 B2 * | 4/2003 | Hendrey ............. H04W 76/002 455/41.2 |
| 6,549,907 B1 | 4/2003 | Fayyad et al. |
| 6,594,672 B1 | 7/2003 | Lampson et al. |
| 6,601,062 B1 | 7/2003 | Deshpande |
| 6,629,094 B1 | 9/2003 | Colby |
| 6,640,218 B1 * | 10/2003 | Golding ............ G06F 17/30867 |
| 6,643,661 B2 | 11/2003 | Polizzi et al. |
| 6,662,174 B2 | 12/2003 | Shah et al. |
| 6,732,115 B2 | 5/2004 | Shah et al. |
| 6,748,394 B2 | 6/2004 | Shah et al. |
| 6,763,357 B1 | 7/2004 | Deshpande et al. |
| 6,766,325 B1 | 7/2004 | Pasumansky et al. |
| 6,832,263 B2 | 12/2004 | Polizzi et al. |
| 7,069,308 B2 * | 6/2006 | Abrams ................. G06Q 10/10 705/319 |
| 7,177,880 B2 * | 2/2007 | Ruvolo et al. |
| 7,188,153 B2 * | 3/2007 | Lunt ..................... G06Q 10/10 705/319 |
| 7,478,078 B2 * | 1/2009 | Lunt ..................... G06Q 30/02 |
| 7,512,612 B1 * | 3/2009 | Akella ............. G06F 17/30958 |
| 7,895,357 B1 * | 2/2011 | Walker .................. G06Q 30/04 705/40 |
| 2002/0016924 A1 | 2/2002 | Shah et al. |
| 2002/0023122 A1 | 2/2002 | Polizzi et al. |
| 2002/0029207 A1 | 3/2002 | Bakalash et al. |
| 2002/0038229 A1 | 3/2002 | Shah et al. |
| 2002/0038297 A1 | 3/2002 | Shah et al. |
| 2002/0099692 A1 | 7/2002 | Shah et al. |
| 2002/0111173 A1 * | 8/2002 | Hendrey ............. H04W 76/002 455/456.3 |
| 2002/0154171 A1 * | 10/2002 | Lee .................. G06F 17/30867 715/781 |
| 2004/0088325 A1 * | 5/2004 | Elder ..................... G06Q 10/10 |
| 2005/0091202 A1 * | 4/2005 | Thomas ........................... 707/3 |
| 2005/0165785 A1 * | 7/2005 | Malkin et al. ................. 707/10 |
| 2005/0177385 A1 * | 8/2005 | Hull et al. ......................... 705/1 |
| 2005/0235062 A1 * | 10/2005 | Lunt et al. ..................... 709/225 |
| 2005/0243736 A1 * | 11/2005 | Faloutsos ............... G06Q 10/04 370/254 |

OTHER PUBLICATIONS

Albrecht, J. et al., "Aggregate-Based Query Processing in a Parallel Data Warehouse Server," Proceedings of the Tenth International Workshop on Database and Expert Systems Applications, Sep. 1-3, 1999, pp. 40-44.

Pourabbas, E. et al., "Characterization of Hierarchies and Some Operators in OLAP Environment," Presented at the ACM 2nd International Workshop on Data Warehousing and OLAP, Nov. 2-6, 1999, pp. 1-17.

Widmann, N. et al., "Efficient Execution of Operations in a DBMS for Multidensional Arrays," Presented at the ACM SIGMOD 1998, pp. 1-11, http://dblp,unitier.de/db/conf/ssdbm/WidmannB98.html.

Korn, F. et al., "Efficiently Supporting Ad Hoc Queries in Large Datasets of Time Sequences," Presented at ACM SIGMOD International Conference on Management of Data, May 11-15, 1997, pp. 1-22, http://www.acm.org/pubs/citations/proceedings/mod/253260.p289-korn/.

Pedersen, T.B., Aspects of Data Modeling and Query Processing for Complex Multidimensional Data, 2000, pp. 1-180, Danish Academy of Technical Sciences.

Pourabbas, E. et al., "Hierarchies and Relative Operators in the OLAP Environment," SIGMOD Record, Mar. 2000, pp. 1-8, vol. 29, No. 1, http://www.dblp,unitrier,de/db/journals/signmod29.html.

Salem, K. et al., "How to Roll a Join: Asynchronous Incremental View Maintenance," Presented at ACM SIGMOD on Management of Data Symposium on Principles of Database Systems, May 15-18, 2000, pp. 1-13, http://www.acm.org/pubs/citations/proceedings/mod/342009/p129-salem/#abstract.

Harinarayan, V. et al., "Implementing Data Cubes Efficiently," Presented at the ACM SIGMOD International Conference on Management of Data, Jun. 4-6, 1996, pp. 205-216.

(56) References Cited

OTHER PUBLICATIONS

Agrawal, R. et al., "Modeling Multidimensional Databases," IBM Almaden Research Center, 1995; Presented at the 13th International Conference on Data Engineering Apr. 1997, pp. 1-23.

Agarwal, S. et al., "On the Computation of Multidimensional Aggregates," Presented at the 22nd VLDB Conference, 1996, pp. 1-16.

Hellerstein, J.M. et al., "Online Agrregation," Presented at the ACM SIGMOD International Conference on Management of Data, May 1997, Tucson, Arizona, pp. 1-12, http://www.acm/org/pubs/citations/proceedings/mod/253260/p171-hellerstein/.

Elkins, S.B., "Open OLAP," DBMS, Apr. 1998, pp. 1-7, http://www.dbmsmag.com/9804d14.html.

Li, C. et al., "Optimizing Statistical Queries by Exploiting Orthogonality and Interval Properties of Grouping Relations," Presented at the 8th International Conference on Scientific & Statistical Database Management, pp. 1-10, Jun. 1996.

Ho, C. et al., "Range Queries in OLAP Data Cubes," Presented at the ACM SIGMOD International Conference on Management of Data, May 11-15, 1997, pp. 1-16, http://www.acm.org/pubs/citations/proceedings/mod/253260/p73-ho/.

"See Data from All Angels with Multidimensional Database Software" SAS Institute Inc., 2001, 1 page, www.sas,com/products/mddb/index/html.

Cheung, D.W. et al., "Towards the Building of a Dense-Region-Based OLAP System," Data and Knowledge Engineering, 2001, pp. 1-27, vol. 36, No. 1, http://www.elsevier.nl/gejng/10/16/74/62/24/24/abstract.html.

McKie, S., "Essbase 4.0," DBMS Online, Jul. 1996, pp. 1-4, http://www.dbmsmag.com/9607d13.html.

Hellerstein, J.M., "Optimization Techniques for Queries with Expensive Methods," ACM Transactions on Database Systems (TODS), 1998, pp. 113-157, vol. 23, No. 2.

Colliat, G., "OLAP, Relational, and Multidimensional Database Systems," SIGMOD Record, Sep. 1996, pp. 64-69, vol. 25, No. 3.

Kimball R., "The Aggregate Navigator; How to Optimize Your Data Warehouse Using Aggregates Without Driving Your End Users Crazy," DBMS, Nov. 1995, http://www.dbmsmag.com.

Pendse, N., "The Origins of Today's OLAP Products," Feb. 6, 2003, pp. 1-7, http://ww.olapreport.com/origins.htm.

"Introduction to Structured Query Language," 2000, pp. 1-33, http:/w3.one.net/about/jhoffmann/sqltut.htm.

Date, C.J., "An Introduction to Database Systems," 2000, pp. 250, 266, 289-326, Addison-Wesley, Seventh Edition.

"The Art of Indexing," a White Paper by DISC, Oct. 1999, pp. 3-30, Dynamic Information Systems Corporation.

Harrington, J.L., "Relational Database Design Clearly Explained," 1998, pp. v-xiii, 1-62, Morgan Kaufman.

Kimball, R., "Aggregate Navigation with (Almost) No MetaData," 1996, pp. 1-8, http://www.dbmsmag.com/9608d54.html.

Duhl, J. et al., "A Performance Comparison of Object and Relational Databases Using the Sun Benchmark," Proceedings of the Conference on Object Programming Systems Languages and Applications, Sep. 25-30, 1988, pp. 153-163.

Gupta, H.V., et al. "Index Selection for OLAP," Proceedings of the 13th International Conference on Data Engineering, Apr. 7-11, 1997, pp. 208-219.

Chaudhuri, S. et al., "An Overview of Data Warehousing and OLAP Technology," SIGMOD Record, New York, NY Mar. 1997, vol. 26, No. 1.

Colby, L.S. et al. "Red Brick Vista, Aggregate Comoputation and Management," Data Engineering 1998 Proceedings, 14th International Confrenence in Orlando, FL., Feb. 23-27, 1998.

Albrecht, J. et al. "Management of Multidimensional Aggregates for Efficient Online Analytical Processing, " Database Engineering and Applications, 1999, International Symposium Proceedings Montreal, Quebec, Canada.

Zhao, Y. et al., "Array-Based Evaluation of Multi-Dimensional Queries in Object-Relational Database Systems," Data Engineering, 1998 Proceedings, 14th International Conference in Orlando, FL, Feb. 23-27, 1998.

* cited by examiner

Adjacency List

| |
|---|
| ME: A, B, C |
| A: ME, F, G |
| B: ME, H |
| C: ME, D, E |
| D: C, I, J |
| E: C, K |
| F: A, L |
| G: A, H |
| H: B, G |
| I: D, N |
| J: D |
| K: E |
| L: F, M |
| M: L |
| N: I, O |
| O: N |
| P: Q, R |
| Q: P, R |
| R: P, Q |
| S: |
| T: U |
| U: T |

GRAPH SERVER QUERYING FOR MANAGING SOCIAL NETWORK INFORMATION FLOW

CROSS-REFERENCE TO RELATED APPLICATIONS

The present application is a continuation of U.S. patent application Ser. No. 10/854,054, filed May 26, 2004, entitled "System and Method for Managing an Online Social Network," which is incorporated by reference herein for all purposes.

BACKGROUND OF THE INVENTION

Field of the Invention

The present invention generally relates to a system and method for managing an online social network, and more specifically, to a system and method for managing information exchange between members of an online social network.

Description of the Related Art

Online social networking sites have been rapidly gaining in popularity, and operators of online social networking sites have been adding servers and switches to their infrastructure to keep up with the increasing demand. Keeping up with the increasing demand has, however, proved to be difficult for two reasons. First, online social networking sites are virally marketed, as current members actively solicit nonmembers to sign up and join the network, and as a result, its growth has been very rapid. Second, the load on the social networking site is dependent not only on the total number of members but also on the total number of relationships. Because a member typically has multiple relationships, this means that the load increase associated with each new member is much greater than typical.

SUMMARY OF THE INVENTION

The present invention deals with the system load demands by improving the processing efficiencies of the online social networking site. The improvement in the processing efficiencies is achieved by providing one or more graph servers to be used in combination with the site's application server. The application server is configured to handle database management tasks, and the graph servers are configured to handle CPU-intensive computational tasks.

More specifically, the application server manages a database that contains member profile information and member relationship information. The graph servers keep track of how the members are socially connected to one another (hereinafter referred to as, "social network map") in a dedicated memory device, and process and respond to queries from the application server using the social network map stored in the dedicated memory device. The social network map that is stored in the dedicated memory device of the graph servers is updated to reflect any changes to the member relationship information that are made in the database.

Because the present invention processes relationship information using a social network map that is stored in a dedicated memory device, the number of database lookups is decreased and an improvement in the processing speed is achieved. Depending on the number of relationships that are tracked, a dramatic improvement in the processing speed might be achieved with the present invention.

DETAILED DESCRIPTION

A social network is generally defined by the relationships among groups of individuals, and may include relationships ranging from casual acquaintances to close familial bonds. A social network may be represented using a graph structure. Each node of the graph corresponds to a member of the social network. Edges connecting two nodes represent a relationship between two individuals. In addition, the degree of separation between any two nodes is defined as the minimum number of hops required to traverse the graph from one node to the other. A degree of separation between two members is a measure of relatedness between the two members.

Figure 1:
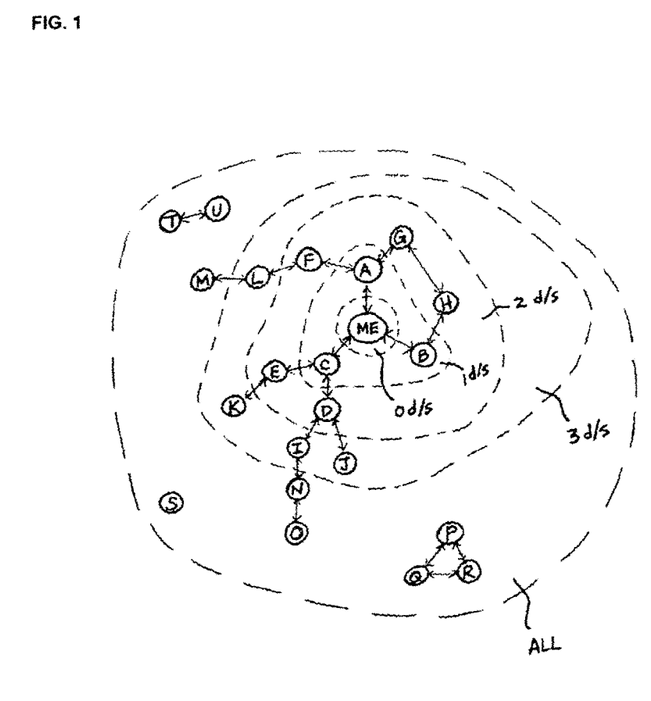
FIG. 1 is a diagram that conceptually represents the relationships between members in a social network.

FIG. 1 is a graph representation of a social network centered on a given individual (ME). Other members of this social network include A-U whose position, relative to ME's, is referred to by the degree of separation between ME and each other member. Friends of ME, which includes A, B, and C, are separated from ME by one degree of separation (1 d/s). A friend of a friend of ME is separated from ME by 2 d/s. As shown, D, E, F and G are each separated from ME by 2 d/s. A friend of a friend of a friend of ME is separated from ME by 3 d/s. FIG. 1 depicts all nodes separated from ME by more than 3 degrees of separation as belonging to the category ALL.

Degrees of separation in a social network are defined relative to an individual. For example, in ME's social network, H and ME are separated by 2 d/s, whereas in G's social network, H and G are separated by only 1 d/s. Accordingly, each individual will have their own set of first, second and third degree relationships.

As those skilled in the art understand, an individual's social network may be extended to include nodes to an Nth degree of separation. As the number of degrees increases beyond three, however, the number of nodes typically grows at an explosive rate and quickly begins to mirror the ALL set.

Figure 2:
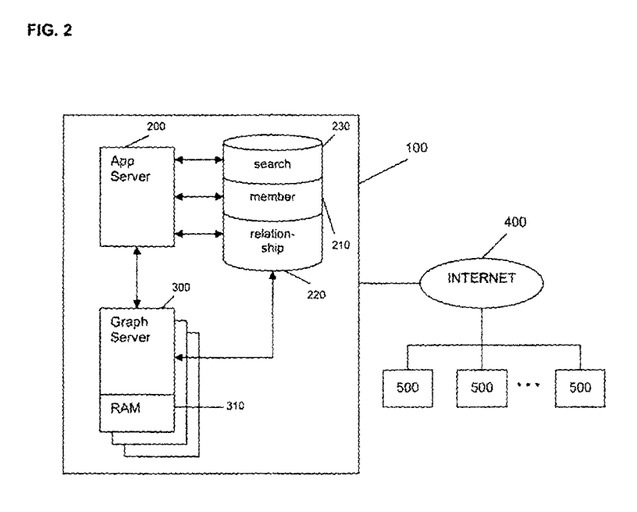
FIG. 2 is a block diagram illustrating the system for managing an online social network according to an embodiment of the present invention.

FIG. 2 is a block diagram illustrating a system for managing an online social network. As shown, FIG. 2 illustrates a computer system 100, including an application server 200 and distributed graph servers 300. The computer system 100 is connected to a network 400, e.g., the Internet, and accessible over the network by a plurality of computers, which are collectively designated as 500.

The application server 200 manages a member database 210, a relationship database 220 and a search database 230. The member database 210 contains profile information for each of the members in the online social network managed by the computer system 100. The profile information may include, among other things: a unique member identifier, name, age, gender, location, hometown, a pointer to an image file, listing of interests, attributes, etc. The profile information also includes VISIBILITY and CONTACTABILITY settings, the uses of which are described below in connection with FIGS. 4 and 5.

The relationship database 220 stores member relationship information in the following format: (MemberID_1, MemberID_2, Time, Add/Delete). MemberID_1 and MemberID_2 identify the two members whose relationship is defined by this input. Time is a variable corresponding to the time stamp of this input. Add/Delete is a variable indicating whether the friendship between MemberID_1 and MemberID_2 is to be added or deleted.

In addition, the contents of the member database 210 are indexed and optimized for search, and stored in the search database 230. The member database 210, the relationship database 220, and the search database 230 are updated to reflect inputs of new member information and edits of existing member information that are made through the computers 500.

The member database 210, the relationship database 220, and the search database 230 are depicted separately in the block diagram of FIG. 2 to illustrate that each performs a different function. The databases 210, 220, 230 may each represent a different database system, module, or software; or any two of the three or all three may be parts of the same database system, module, or software.

The application server 200 also manages the information exchange requests that it receives from the remote computers 500. The information exchange requests may be a request to view a member's profile (FIG. 4), a request to send messages to a member (FIG. 5), or a search request (FIG. 6). The application server 200 relies on the distributed graph servers 300 to process certain CPU-intensive tasks that are part of the information exchange request. The graph servers 300 receive a query from the application server 200, process the query and return the query results to the application server 200.

Figure 3:
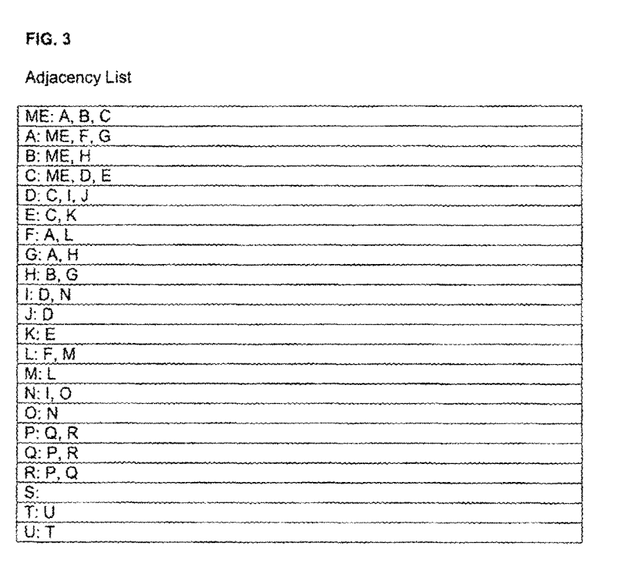
FIG. 3 is a sample adjacency list that is maintained by the graphs servers of the present invention.

The graph servers 300 have a dedicated memory device 310, such as a random access memory (RAM), in which an adjacency list that reflects the member relationship information is stored. A sample adjacency list that reflects the social network map of FIG. 1 is shown in FIG. 3. A list item is generated for each member and contains a member identifier for that member and member identifier(s) corresponding to friend(s) of that member. As an alternative to the adjacency list, an adjacency matrix or any other graph data structure may be used.

The graph servers 300, on a fixed interval, e.g., every five minutes, check the relationship database 220 for any incremental changes to the member relationship information. If there is, e.g., if (current time—5 minutes) is less than or equal to the time stamp corresponding to an entry in the relationship database 220, the adjacency list stored in the dedicated memory device 510 is updated to reflect such incremental change. If a friendship is to be added, the adjacency list item for MemberID_1 is amended to add MemberID_2 and the adjacency list item for MemberID_2 is amended to add MemberID_1. If a friendship is to be deleted, the adjacency list item for MemberID_1 is amended to delete MemberID_2 and the adjacency list item for MemberID_2 is amended to delete MemberID_1. Alternatively, the adjacency list can be updated in real time, i.e., synchronously with the updates to the relationship database 220.

The queries processed by the graph servers 300 include:
List_of_Members (M1, N d/s), which returns a list of member identifiers of all members who are exactly N d/s from member M1;
No_of_Members (M1, N d/s), which returns a raw number indicating the number of members who are exactly N dis from member M1;
Get_Network (M1, N d/s), which returns a list of member identifiers of all members that are within N dis from member M1;
Shortest_Path (M1, M2), which returns the shortest path, if any, between member M1 and member M2 (the shortest path is displayed in the form of member identifiers of those members disposed in the shortest path between member M1 and member M2); and
Are_Connected? (M1, M2, degrees), which returns the degree of separation corresponding to the shortest path between member M1 and member M2, if the two are connected. If the two are not connected, an error code indicating that the two members are not connected is returned.

For the calculation of the shortest path in the queries listed above, any of the shortest path algorithms for a node network defined by an adjacency list may be used, e.g., breadth first search algorithm. The algorithms for carrying out other calculations that are necessary to process the queries listed above are programmed using conventional techniques.

In FIG. 2, a plurality of distributed graph servers 300 are depicted, and is preferred over a single graph server because the distributed structure permits resources to be shared. However, the present invention may also be practiced with a single graph server.

The application server 200 and the graphs servers 300 are depicted separately in the block diagram of FIG. 2 to illustrate that the two are performing separate processes. The application server 200 and the graphs servers 300 may be housed within a single physical structure, or they may be parts of a single processor that is programmed to carry out their separate processes in parallel.

Figure 4:
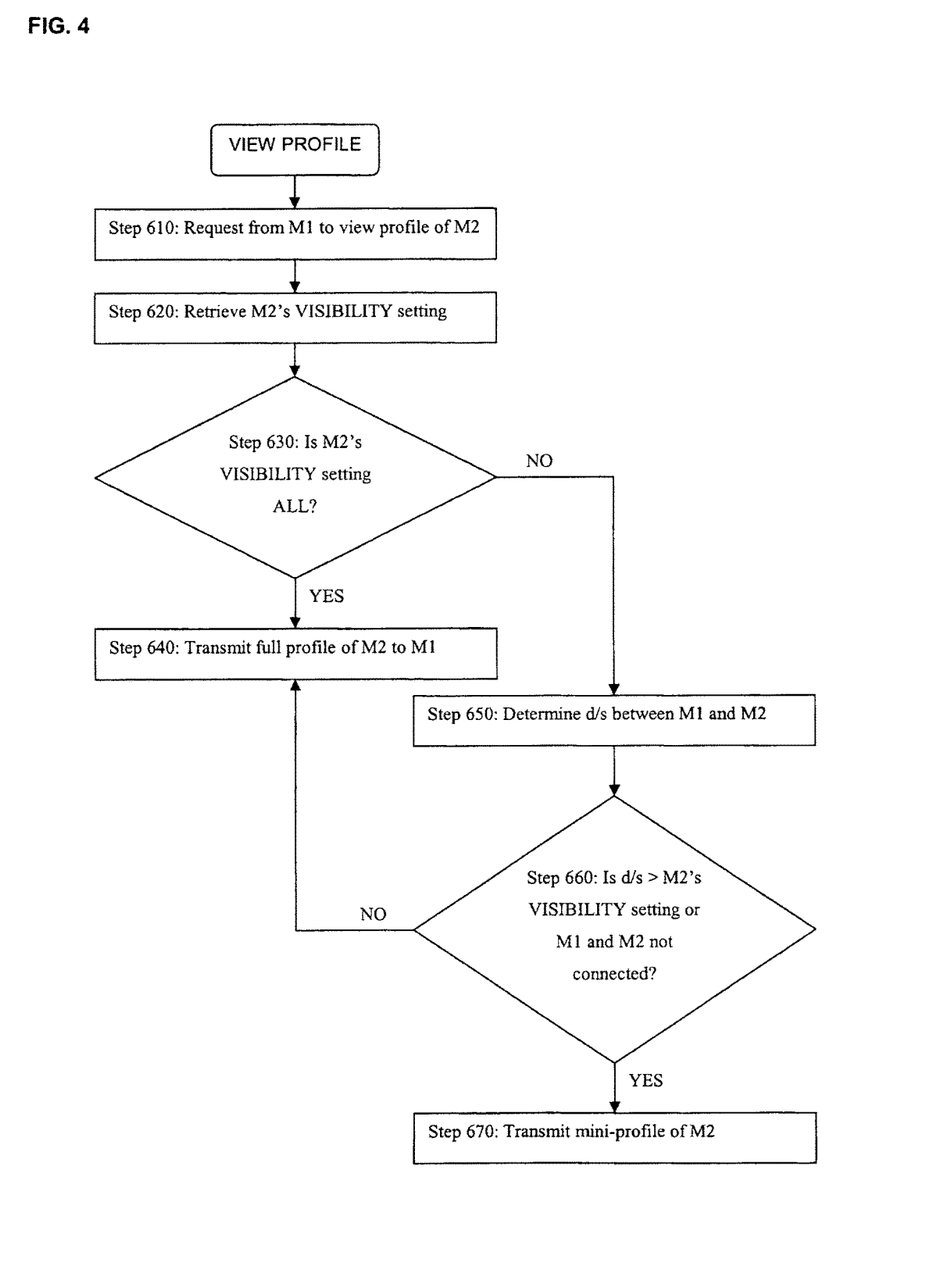
FIG. 4 is a flow diagram illustrating the method for processing a request by one member to view the profile of another member in the system of FIG. 2.

FIG. 4 is a flow diagram illustrating the method for processing a request by one member (e.g., M1) to view the profile of another member (e.g., M2) in the system of FIG. 2. In Step 610, the application server 200 receives a request by member M1 to view the profile of member M2. As an example, this happens when member M1 clicks on a hyperlink associated with member M2. The full profile of member M2 will be displayed if the d/s between M1 and M2 is less than or equal to the VISIBILITY setting set by member M2 or if the VISIBILITY setting set by member M2 is ALL. (VISIBILITY setting may be set at 1, 2, 3 or ALL.) Otherwise, only the mini-profile of member M2 will be displayed. In Step 620, the application server 200 retrieves M2's VISIBILITY setting from the member database 210. If M2's VISIBILITY setting is ALL, the full profile of M2 will be transmitted to M1 for display at M1's computer (Steps 630 and 640). If not, the application server 200 sends the Are_Connected? query to the graph servers 300 to determine the d/s between member M1 and member M2 (Steps 630 and 650). The graph servers 300 execute this query and return the dIs that it computed to the application server 200. If the computed dIs is greater than the VISIBILITY setting or if member M1 and member M2 are not connected, the mini-profile of member M2 and a message indicating that member M2's full profile can only be viewed by members in his or her personal network is transmitted to M1 for display at M1's computer (Steps 660 and 670). Otherwise, the full profile of member M2 is transmitted to M1 for display at M1's computer (Steps 660 and 640).

Figure 5:
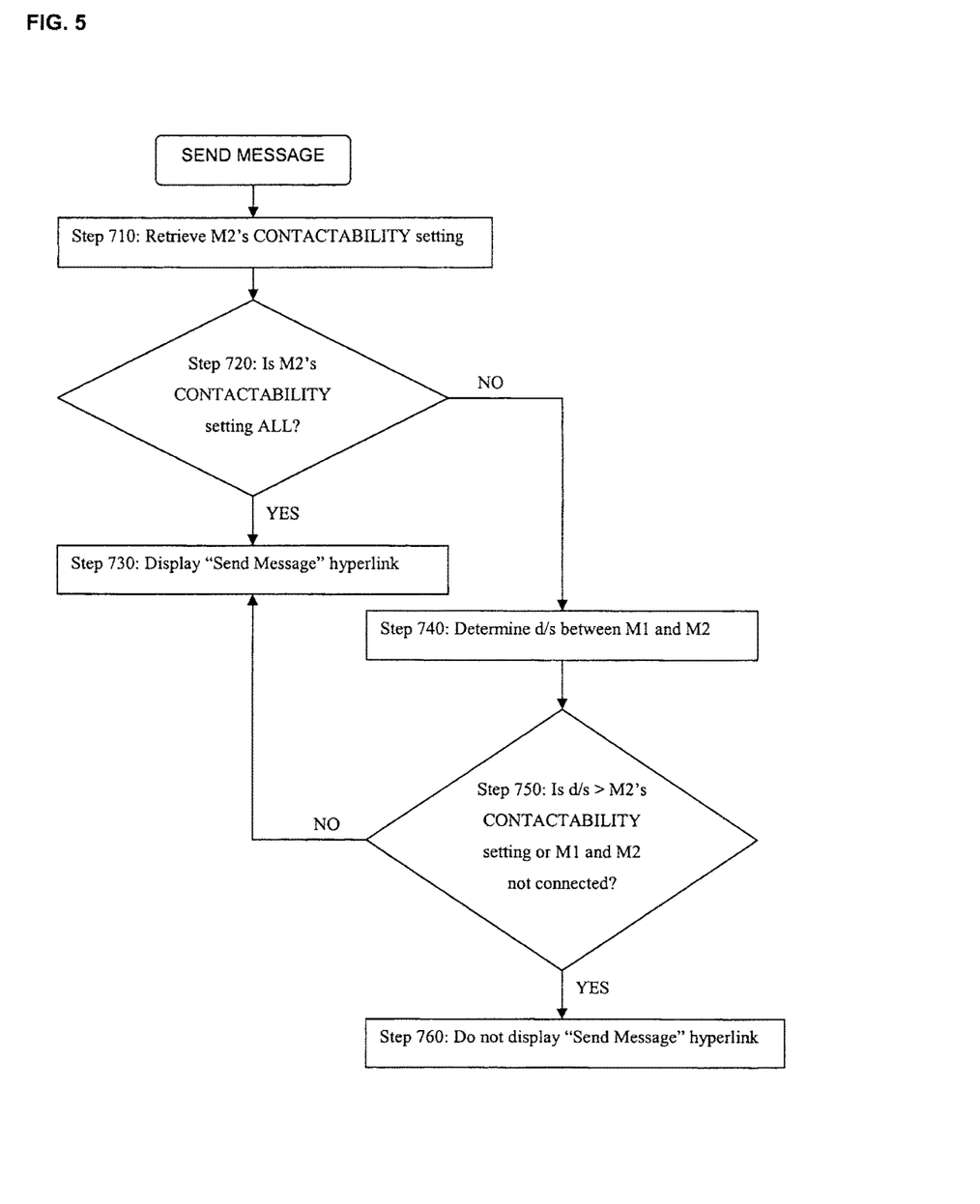
FIG. 5 is a flow diagram illustrating the method for determining whether a member can be contacted by another member in the system of FIG. 2.
Figure 6:
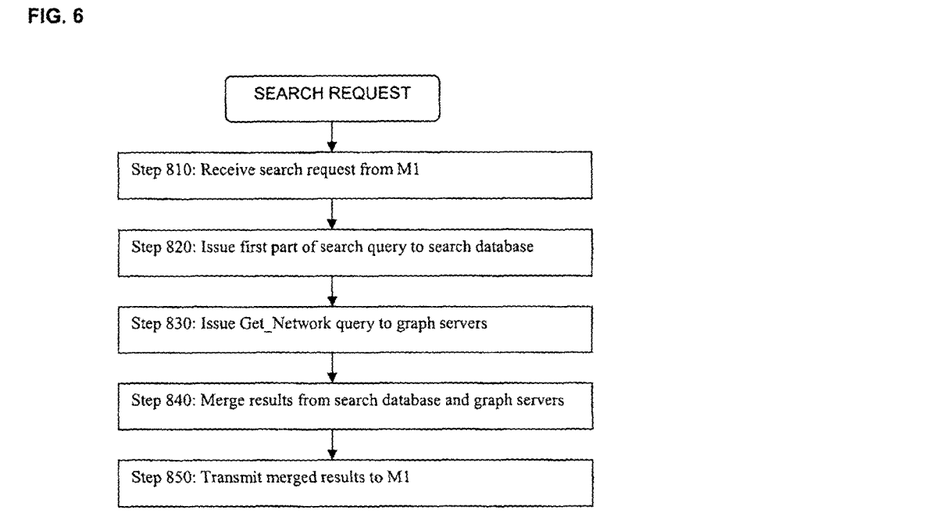
FIG. 6 is a flow diagram illustrating the method for processing a search request in the system of FIG. 2.

FIG. 5 is a flow diagram illustrating the method for determining whether a member can be contacted by another member in the system of FIG. 2. In the example given herein, it is assumed that member M1 is attempting to send a message to member M2. In Step 710, the application server 200 retrieves the CONTACTABILITY setting of member M2. (CONTACTABILITY setting may be set as 1, 2, 3 or ALL.) If M2's CONTACTABILITY setting is ALL, this means that member M2 is permitting contact from anyone, and consequently, when member M1 views member M2's profile, a "Send Message" hyperlink will appear through which member M1 will be able to send messages to member M2 (Steps 720 and 730). If M2's CONTACTABILITY setting is not set to ALL, the application server 200 sends the Are_Connected? query to the graph servers 300 to determine the d/s between member M1 and member M2 (Steps 720 and 740). The graph servers 300 execute this query and return the d/s that it computed to the application server 200. If the computed d/s is greater than the CONTACTABILITY setting or if member M1 and member M2 are not connected, this means that member M2 is not permitting contact from member M1 and the "Send Message" hyperlink will not be displayed when member M1 views member M2's profile (Steps 750 and 760). If the computed d/s is less than or equal to the CONTACTABILITY setting, this means that member M2 is permitting contact from member M1, and consequently, when member M1 views M2's profile, a "Send Message" hyperlink will appear through which member M2 will be able to send messages to member M1 (Steps 750 and 730).

FIG. 6 is a flow diagram illustrating the method for processing a search request in the system of FIG. 2. In Step 810, the application server 200 receives a search query input by member M1. The search query is divided into two parts. The first part specifies search terms for pre-selected categories such as gender, age, interests and location. The second part specifies a d/s setting, which may be set at 1, 2, 3 or ALL. For example, the search query may be: [gender (female), age (less than 30), d/s (at most 2)]. The first part of this search query is [gender (female), age (less than 30)] and the second part of this search query is [d/s (at most 2)]. In Step 820, the application server 200 issues the first part of the search query to the search database 230 to obtain member identifiers for those members whose profiles meet the specified criteria. In Step 830, the application server 200 issues a Get Network query to the graph servers 300 to obtain a list of member identifiers of all members that are within the d/s specified in the second part of the search query. The application server 200 merges the results from the search database 230 and the graph servers 300 (Step 840), and transmits the merged results to member M1 (Step 850). After the merged results are delivered to member M1, the member may click on any of the results to view that member's profile and, if the "Send Message" hyperlink is displayed, attempt to send a message to that member through that hyperlink.

While particular embodiments according to the invention have been illustrated and described above, it will be clear that the invention can take a variety of forms and embodiments within the scope of the appended claims.

What is claimed is:

1. A method comprising:
    by one or more computing devices, storing a list of member relationships in a social-networking system, the social-networking system comprising a graph comprising a plurality of nodes and edges connecting the nodes, wherein at least some of the nodes correspond to the members of the social-networking system;
    by one or more computing devices, monitoring changes in relationship between the members of the social-networking system;
    by one or more computing devices, updating the list in response to relationship changes;
    by one or more computing devices, receiving from an application server a query;
    by one or more computing devices, processing the query using the stored list of member relationships; and
    by one or more computing devices, returning the query results to the application server, wherein the query results comprise degrees-of-separation information with respect to one or more members of the social-networking system.

2. The method of claim 1, the query comprising a degrees-of-separation value and member identifier.

3. The method of claim 2, the results comprising a list of all members of the social-networking system that are exactly the degrees-of-separation value from the member associated with the member identifier.

4. The method of claim 2, the results comprising the number of members of the social-networking system within the degrees-of-separation value from the member associated with the member identifier.

5. The method of claim 1, the query comprising a first member identifier and a second member identifier.

6. The method of claim 5, the results comprising the shortest path between the member associated with the first member identifier and the member associated with the second member identifier.

7. The method of claim 6, the results comprising a list of all members disposed in the shortest path.

8. The method of claim 5, the results comprising the number of degrees of separation corresponding to the shortest path between the member associated with the first identifier and the member associated with the second identifier.

9. One or more computer-readable non-transitory storage media embodying software that is configured to, when executed:
    store a list of member relationships in a social-networking system, the social-networking system comprising a graph comprising a plurality of nodes and edges connecting the nodes, wherein at least some of the nodes correspond to the members of the social-networking system;
    monitor changes in relationship between the members of the social-networking system;
    update the list in response to relationship changes;
    receive, from an application server, a query;
    process the query using the stored list of member relationships; and
    return the query results to the application server, wherein the query results comprise degrees-of-separation information with respect to one or more members of the social-networking system.

10. The media of claim 9, the query comprising a degrees-of-separation value and member identifier.

11. The media of claim 10, the results comprising a list of all members of the social-networking system that are exactly the degrees-of-separation value from the member associated with the member identifier.

12. The media of claim 10, the results comprising the number of members of the social-networking system within the degrees-of-separation value from the member associated with the member identifier.

13. The media of claim 9, the query comprising a first member identifier and a second member identifier.

14. The media of claim 13, the results comprising the shortest path between the member associated with the first member identifier and the member associated with the second member identifier.

15. The media of claim 14, the results comprising a list of all members disposed in the shortest path.

16. The media of claim 13, the results comprising the number of degrees of separation corresponding to the shortest path between the member associated with the first identifier and the member associated with the second identifier.

17. A system comprising:
one or more processors; and
a memory coupled to the processors comprising instructions executable by the processors, the processors being configured to, when executed:
store a list of member relationships in a social-networking system, the social-networking system comprising a graph comprising a plurality of nodes and edges connecting the nodes, wherein at least some of the nodes correspond to the members of the social-networking system;
monitor changes in relationship between the members of the social-networking system;
update the list in response to relationship changes;
receive, from an application server, a query;
process the query using the stored list of member relationships; and
return the query results to the application server, wherein the query results comprise degrees-of-separation information with respect to one or more members of the social-networking system.

18. The system of claim 17, the query comprising value and member identifier.

19. The system of claim 18, the results comprising a list of all members of the social-networking system that are exactly the degrees of separation value from the member associated with the member identifier.

20. The system of claim 18, the results comprising the number of members of the social-networking system within the degrees of separation value from the member associated with the member identifier.

21. The system of claim 17, the query comprising a first member identifier and a second member identifier.

22. The system of claim 21, the results comprising the shortest path between the member associated with the first member identifier and the member associated with the second member identifier.

23. The system of claim 22, the results comprising a list of all members disposed in the shortest path.

24. The system of claim 21, the results comprising the number of degrees of separation corresponding to the shortest path between the member associated with the first identifier and the member associated with the second identifier.

* * * * *